US007636694B1

(12) United States Patent
Wankmueller et al.

(10) Patent No.: US 7,636,694 B1
(45) Date of Patent: Dec. 22, 2009

(54) APPARATUS AND METHOD FOR GENERATING AN ELECTRONIC-COMMERCE PERSONAL IDENTIFICATION NUMBER CRYPTOGRAPHICALLY RELATED TO AN ATM PERSONAL IDENTIFICATION NUMBER

(75) Inventors: John Wankmueller, New Hyde Park, NY (US); Carl Campbell, Newtown Square, PA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 09/399,192

(22) Filed: Sep. 17, 1999

Related U.S. Application Data

(60) Provisional application No. 60/100,982, filed on Sep. 18, 1998.

(51) Int. Cl.
G06Q 20/00 (2006.01)
(52) U.S. Cl. .............................. 705/64; 705/67; 705/70; 705/71; 705/75
(58) Field of Classification Search .................. 705/64, 705/67, 72
See application file for complete search history.

(56) References Cited

U.S. PATENT DOCUMENTS

| 4,214,230 | A  | * | 7/1980  | Fak et al. ................... 705/72 X |
| 4,223,403 | A  | * | 9/1980  | Konheim et al. ............... 705/72 |
| 4,997,288 | A  | * | 3/1991  | Rosenow ................... 705/64 X |
| 5,175,766 | A  | * | 12/1992 | Hamilton ...................... 705/71 |
| 5,265,162 | A  | * | 11/1993 | Bush et al. .................... 705/67 |
| 5,724,423 | A  | * | 3/1998  | Khello ........................ 713/184 |
| 5,731,575 | A  | * | 3/1998  | Zingher et al. .............. 235/379 |
| 5,877,482 | A  | * | 3/1999  | Reilly ........................ 235/380 |
| 6,049,785 | A  | * | 4/2000  | Gifford ........................ 705/39 |
| 6,163,771 | A  | * | 12/2000 | Walker et al. ................. 705/18 |
| 6,308,887 | B1 | * | 10/2001 | Korman et al. .............. 235/379 |
| 6,484,260 | B1 | * | 11/2002 | Scott et al. ................... 713/186 |
| 6,575,372 | B1 | * | 6/2003  | Everett et al. ............... 235/492 |
| 2001/0023415 | A1 | * | 9/2001 | Keil ............................. 705/44 |
| 2002/0152180 | A1 | * | 10/2002 | Turgeon ....................... 705/72 |
| 2003/0053609 | A1 | * | 3/2003 | Risafi et al. .............. 379/114.2 |
| 2004/0020982 | A1 | * | 2/2004 | Hoffman et al. ............ 235/379 |

* cited by examiner

*Primary Examiner*—Charles C Agwumezie
(74) *Attorney, Agent, or Firm*—Baker Botts L.L.P.

(57) ABSTRACT

An apparatus and method by which a user or cardholder can be given an Electronic-Commerce PIN that bears no discernible relation to the ATM PIN, but from which the ATM PIN can be cryptographically determined using the cardholder's account number and an issuer-unique "conversion" secret key. The intent is that the Maestro Master Debit Switch, or else the Member Interface Processor, whichever is appropriate to a given issuer, can "convert" an Electronic-Commerce PIN to an ATM PIN, so that the member, by verifying the ATM PIN, is in effect verifying the Electronic-Commerce PIN. If the Electronic-Commerce PIN is entered incorrectly, it will convert into an incorrect ATM PIN. Thus the member's EDP facility need not deal with two PINs, yet the ATM PIN is not exposed to possible compromise in PCs or other electronic-commerce equipment. The suggested approach ensures that any disclosure of the Electronic-Commerce PIN does not disclose the ATM PIN.

25 Claims, 5 Drawing Sheets

APPARATUS AND METHOD FOR GENERATING AN ELECTRONIC-COMMERCE PERSONAL IDENTIFICATION NUMBER CRYPTOGRAPHICALLY RELATED TO AN ATM PERSONAL IDENTIFICATION NUMBER

This application claims priority to U.S. Provisional Patent Application entitled "An Electronic-Commerce PIN Cryptographically Related to an ATM PIN," Ser. No. 60/100,982, which was filed on Sep. 18, 1998.

FIELD OF THE INVENTION

The invention relates generally to the field of information security, and more particularly to an apparatus and method for generating a password such as a personal identification number (PIN) which can be used over an electronic communications network such as the Internet in connection with conducting financial transactions ("Electronic Commerce").

BACKGROUND OF THE INVENTION

Electronic Commerce (e-commerce) is growing at an incredible rate. With the ever expanding popularity of electronic networks such as the Internet, companies and individuals are seeking ways to efficiently use such networks as a medium for conducting business. While e-commerce is steadily growing in popularity, a potential impediment to realizing Electronic Commerce's full potential resides in a perception that financial information which is required to perform a transaction, such as credit card account data and debit card personal identification numbers and the like, is subject to interception and misuse by unauthorized third parties when transmitted over an open network such as the Internet.

In general, to process payment information over a network, a personal identification number ("PIN") can be used to verify that the sender of payment information is the person or entity authorized to use the payment information. For example, if a customer is using a debit card or other electronic account access to purchase goods and services on the Internet, the payment information can include a PIN which will be checked by the debit card issuer's processing center. If the PIN is valid, the transaction will proceed pending other verifications. If the PIN is invalid, the customer will be asked to retransmit the payment information with the correct PIN. If the correct PIN is not entered after a predetermined number of times, the transaction will be denied. While using a credit card over a network currently does not typically involve the use of a PIN, the verification technique of a PIN could be used with credit cards or electronic cash cards.

Additional information regarding the secure use of PINs in Electronic Commerce can be found in U.S. patent application entitled "Asymmetric Encrypted PIN," Ser. No. 09/321,977, filed on May 28, 1999, which is hereby incorporated by reference.

In some cases, the Electronic-Commerce PIN (i.e., the PIN used to purchase goods and services over a network) can be identical, or similar, to the customer's automatic teller machine ("ATM") PIN. However, Electronic Commerce is sometimes transacted over networks which are less secure than ATMs, and because the ATM PIN prevents the unauthorized use of the card or account information in the case of a lost or stolen card, ATM PIN information must be treated very securely. Accordingly, for non-ATM transactions such as those related to Electronic Commerce, it is desirable to avoid using the ATM PIN, especially if the non-ATM transactions are being performed within an environment or machine which is less secure than an ATM.

SUMMARY OF THE INVENTION

Accordingly, it is an object of the invention to provide a password such as an Electronic-Commerce PIN for use in financial transactions, such that the password is different from the ATM PIN and an unauthorized party would be prevented from deducing the ATM PIN from the Electronic-Commerce PIN, but an authorized party knowing a secret key can recover the ATM PIN from the Electronic-Commerce PIN (e.g., the Electronic-Commerce PIN is a reversible encrypted version of the ATM PIN).

In accordance with the invention, a mathematical operation is performed upon an ATM PIN and a cryptographically-generated number, thereby generating an Electronic-Commerce PIN.

The cryptographically-generated number can be generated by performing an encryption and/or decryption procedure upon, e.g., a number such as an account number, using a conversion key. The conversion key can be associated with a card issuer, and can be generated by, e.g., performing an encryption and/or decryption procedure upon a bank identification number (BIN) using a conversion key derivation key.

It may be necessary to convey a conversion key from one institution to another, desirably in encrypted form. When this is necessary, it may be desirable to transmit with the conversion key, a non-secret "key check value", so that the recipient of a key can ensure that the key was not garbled during transmission or decryption. When such a key-check value is required, the originator of the key can generate it by a cryptographic procedure encrypting a non-secret value known to the key recipient using a portion of the resulting ciphertext as the key-check value.

When, in the course of performing a transaction, a user inputs a number purported to be the Electronic-Commerce PIN, a cryptographic process based on the conversion key can be used to transform this Electronic Commerce PIN (if inputted correctly) into the ATM PIN for re-encryption and transmission to the issuer, so that the issuer can use its current PIN verification methodology to verify the inputted PIN. This cryptographic transformation (from Electronic-Commerce PIN to ATM PIN) in general uses an account-unique number, most likely the account number.

Further objects, features, and advantages of the invention will become apparent from the following detailed description taken in conjunction with the accompanying figures showing illustrative embodiments of the invention.

BRIEF DESCRIPTION OF THE DRAWINGS

The invention is explained in greater detail below by reference to the drawings, in which.

DETAILED DESCRIPTION OF THE PREFERRED EMBODIMENTS

In accordance with the invention, an Electronic-Commerce PIN can be generated by performing a cryptographic operation upon an ATM PIN. The operation can include cryptographically generating a number by encrypting a number such as an account number, and then computing the sum or the difference of the ATM PIN and the cryptographically-generated number. When the Electronic-Commerce PIN is subsequently submitted by a customer in order to perform a transaction (e.g., purchase goods or services), the ATM PIN can be computed by calculating the difference or the sum of the Electronic-Commerce PIN and the aforementioned cryptographically-generated number, depending upon whether the Electronic-Commerce PIN was originally generated by calculating the sum or the difference, respectively, of the ATM PIN and the cryptographically-generated number.

The cryptographic operation discussed above can be, for example, a symmetric encryption. Symmetric encryption uses a secret key as part of a mathematical formula which encrypts data by transforming the data using the formula and key. After the data is encrypted, another party can decrypt the data using the same secret key with a related decryption algorithm. Because the same key is used for both encryption and decryption, the technique is said to be symmetric. A conventional example of a symmetric encryption algorithm is the NIST Data Encryption Standard (DES).

A more secure form of DES symmetric encryption involves encrypting data using multiple keys. In this technique, called triple DES, data is first encrypted with symmetric key A, then decrypted using symmetric key B (which in effect further encrypts the data), and then further encrypted using key A again. Once the data has arrived at its destination, key A is used to decrypt the data, key B is used to encrypt the data, and key A is used to decrypt the data. These extra steps of encryption and decryption make the technique more secure because they prevent the use of an exhaustive process to determine the key.

Another type of encryption technique which can be used in connection with the invention is "AES" or "Advanced Encryption Standard" which will apparently use a 128 bit key (whereas triple DES uses a 112 bit key).

Generation of the "Conversion Key"

In accordance with an advantageous embodiment of the invention, a message switching system, and in this example a "Maestro Master Debit Switch", MDS, controlled by Mastercard's "Maestro" point-of-sale debit program, creates, within its "host security module", a physically-secure device, a (for example) "Conversion Key Derivation Key" that is unknown to any person. This key should be kept highly secure since its compromise would disclose all Conversion Keys of all Issuers, and it should be a double-length key if DES is the encryption algorithm.

Figure 1:
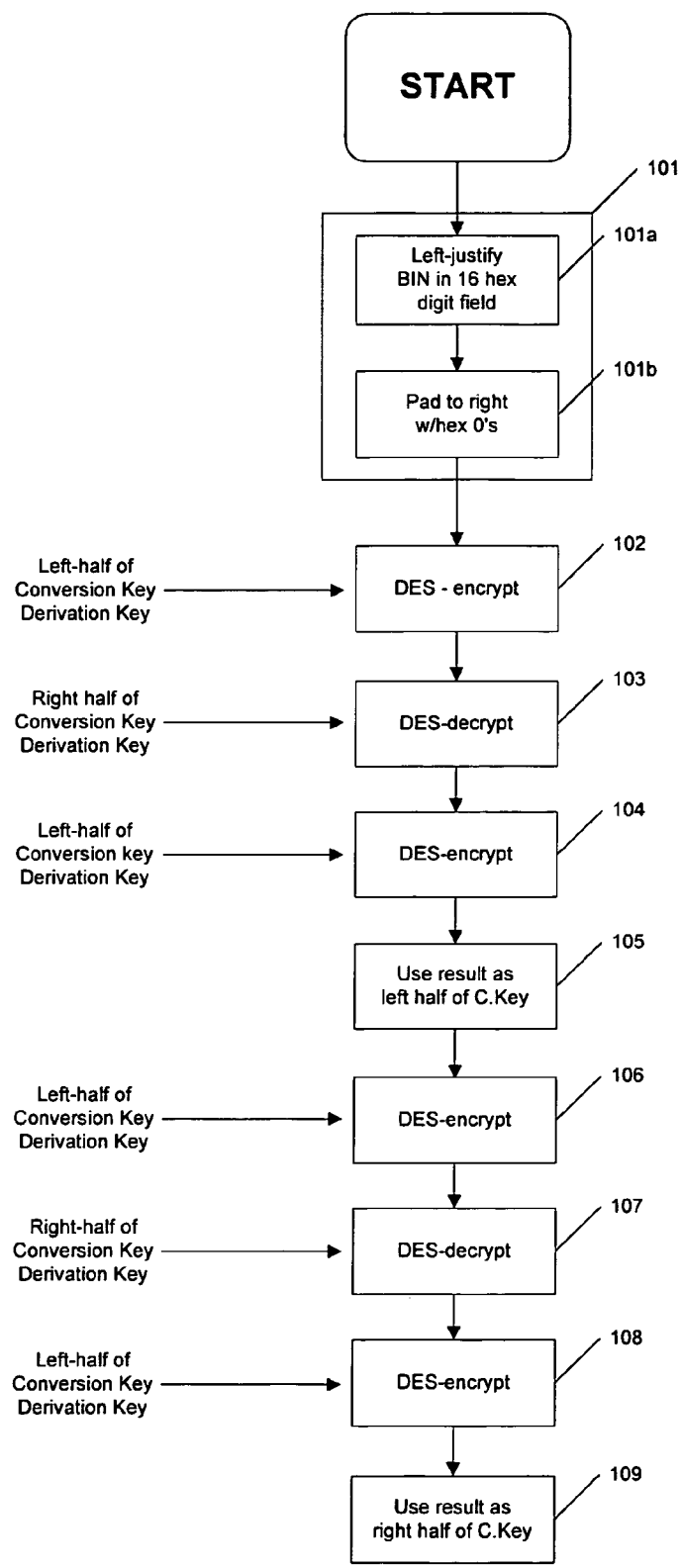
FIG. 1 is a flow chart of an exemplary procedure for generating a conversion key in accordance with the invention.

For each of an issuer's bank identification numbers ("BINs") a unique double-length Conversion Key can be computed, within the security module of the MDS, by the following exemplary Conversion Key generation procedure, illustrated in FIG. 1:

STEP 101. Left-justify the BIN as binary-coded-decimal in a 16 hexadecimal ("hex") digit field (Step 101a), padded to the right with hex "0" digits (Step 101b), thereby producing Conversion Key derivation data.

STEP 102. DES-encrypt the Conversion Key derivation data using the left half of the double-length Conversion Key Derivation Key, thereby producing a first Conversion Key generation result.

STEP 103. DES-decrypt the first Conversion Key generation result using the right half of the double-length Conversion Key Derivation Key, thereby producing a second Conversion Key generation result.

STEP 104. DES-encrypt the second Conversion-Key generation result using (again) the left half of the double-length Conversion Key Derivation Key, thereby producing a third Conversion Key generation result.

STEP 105. Use the third Conversion Key generation result as the left half of the Conversion Key.

STEP 106. DES-encrypt the third Conversion Key generation result using (again) the left half of the double-length Conversion Key Derivation Key, thereby producing a fourth Conversion Key generation result.

STEP 107. DES-decrypt the fourth Conversion Key generation result using (again) the right half of the double-length Conversion Key Derivation Key, thereby producing a fifth Conversion Key generation result.

STEP 108. DES-encrypt the fifth Conversion Key generation result using (again) the left half of the double-length Conversion Key Derivation Key, thereby producing a sixth Conversion Key generation result.

STEP 109. Use the sixth Conversion Key generation result as the right half of the Conversion Key.

Figure 2:
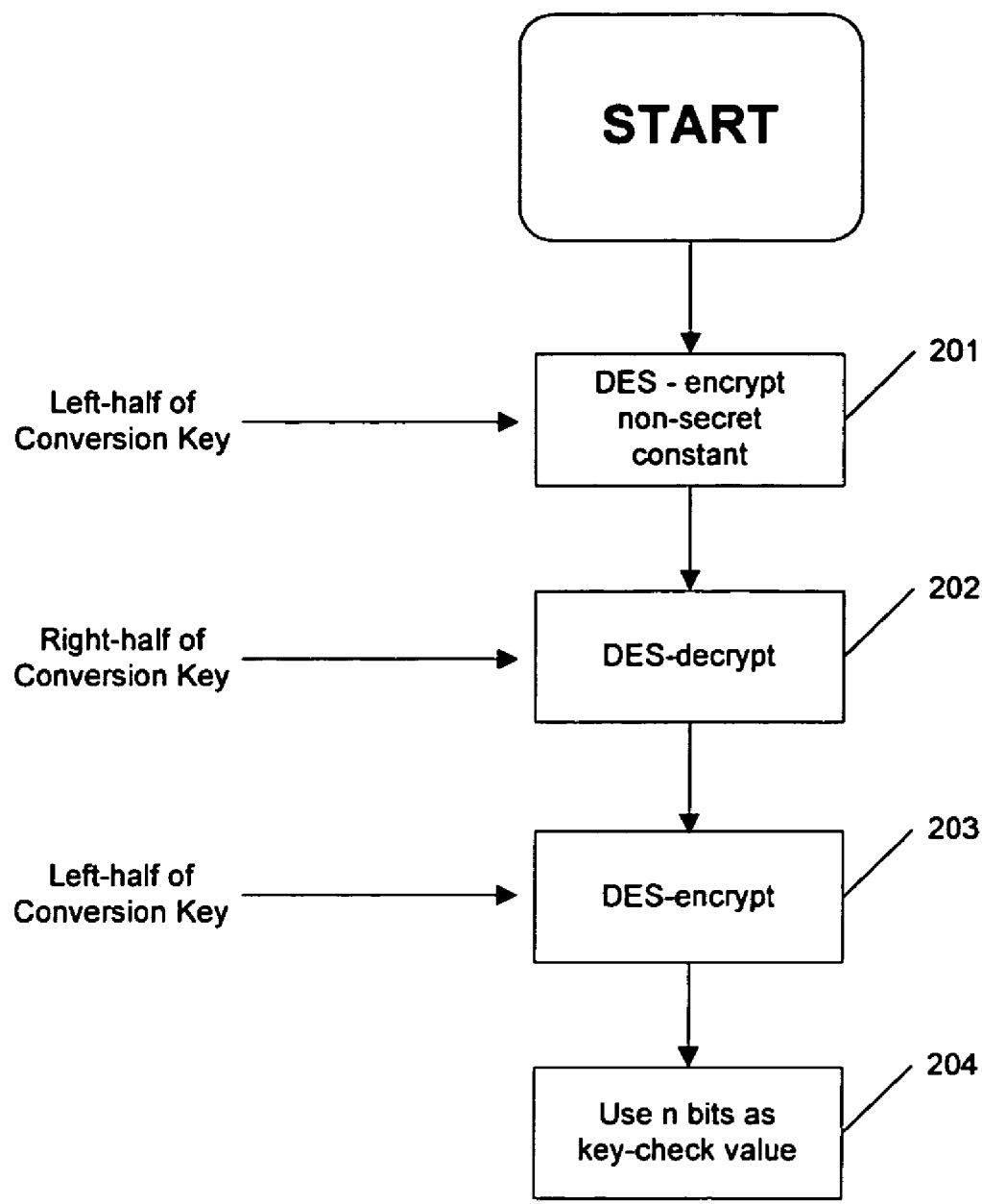
FIG. 2 is a flow chart of an exemplary procedure for generating a key-check value in accordance with the invention.

If a key-check value is desired on the just-generated Conversion Key, it can be produced by the following exemplary procedure, illustrated in FIG. 2:

STEP 201. DES-encrypt a non-secret 16-hex-digit constant known to the recipient (e.g. the associated BIN, left-justified and padded to the right with hex "F" digits) using the left half of the double-length Conversion Key, thereby producing a first key-check value generation result. (Note: Use of the BIN in the key-check-value-generation process ensures that any accidental or deliberate association of the wrong BIN with the key will be detected.).

STEP 202. DES-decrypt the first key-check value generation result using the right half of the double-length Conversion Key, thereby producing a second key-check value generation result.

STEP 203. DES-encrypt the second key-check value generation result using (again) the left half of the double-length Conversion Key, thereby producing a third key-check value generation result.

STEP 204. Use "n" (where "n" might typically be 24) leftmost bits of the third key-check value generation result as the key-check value.

The Conversion Key (and its key-check value), along with the associated BIN, can then optionally be conveyed by secure means to the issuer, if it is desirable for the issuer, rather than the Maestro Master Debit Switch, to produce the Electronic-Commerce PINs. It is preferable to encrypt the Conversion Key under a double-length key for such conveyance, and if the Conversion Key is stored by the issuer, it is preferable to encrypt the Conversion Key under a double-length key, such that the cleartext Conversion Key is available only within the host security modules of the MDS and the issuer.

Generation of The Electronic-Commerce Pin

The Electronic-Commerce PIN for each participating cardholder can be generated either by the issuer itself, or by the Maestro Master Debit Switch as, e.g., a service to the issuer. The cleartext ATM PIN should be available to this process, which is preferably performed within a host security module.

Generation by the Issuer

Figure 3:
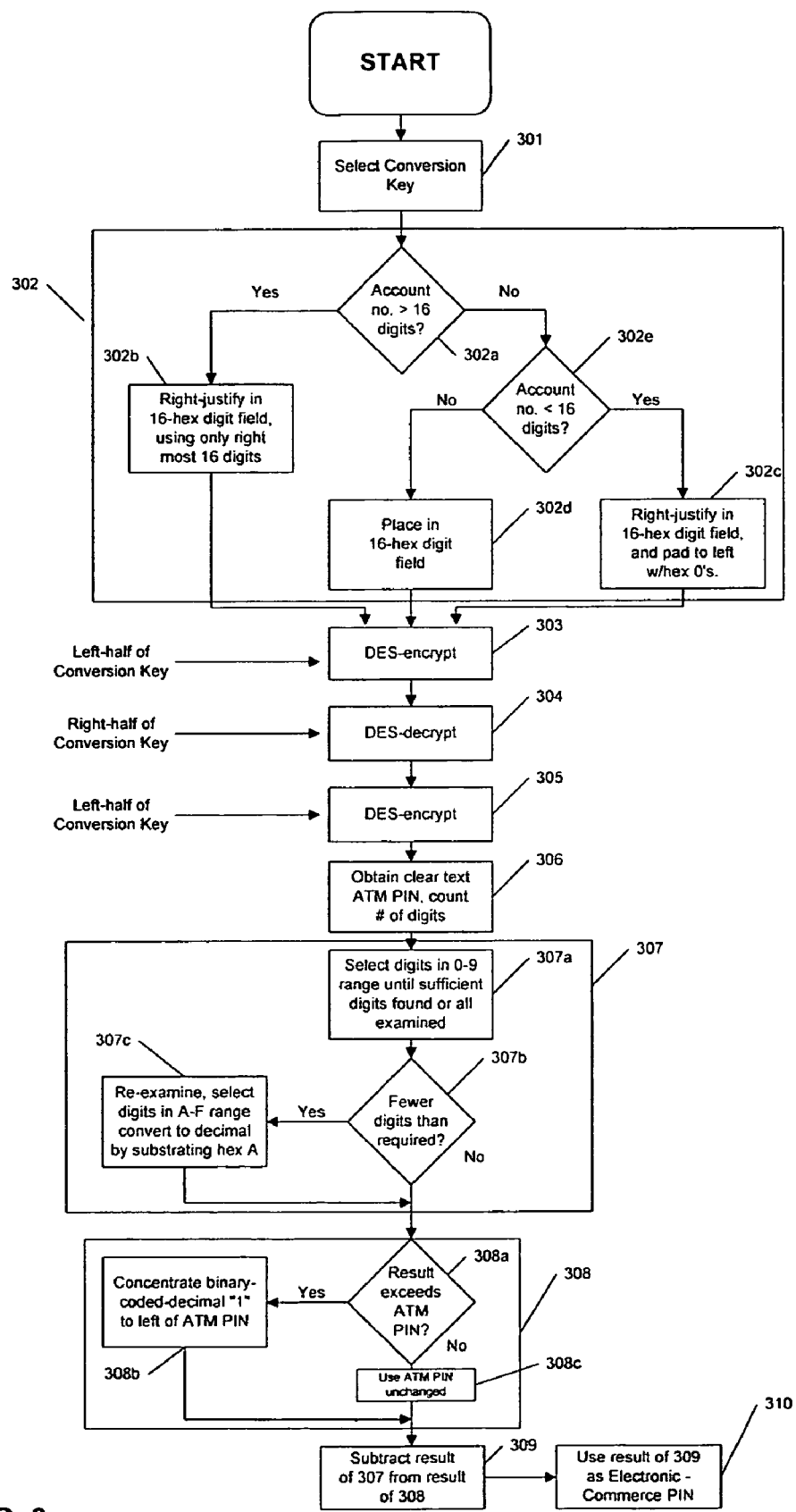
FIG. 3 is a flow chart of an exemplary procedure for generating an Electronic-Commerce PIN from the ATM PIN in accordance with the invention.

When the Electronic-Commerce PIN is generated by the issuer itself, the issuer can use the following exemplary procedure, illustrated in FIG. 3:

STEP 301. Select the Conversion Key appropriate to the BIN of the account number associated with this PIN.

STEP 302. Right-justify the card's account number as binary-coded-decimal in a 16-hex digit field. If the account number exceeds 16 digits (Step 302a), use only the right-most 16 digits (Step 302b). If the account number has fewer than 16 digits (Step 302e), pad to the left with hex "0" (Step 302c). If the account number has exactly 16 digits, simply use all of the digits; there is no need to pad the number (Step 302d). Step 302 produces initial data for use in generating the Electronic-Commerce PIN.

STEP 303. Using the left-half of the selected Conversion Key, DES-encrypt the initial data, thereby producing a first Electronic-Commerce PIN generation result.

STEP 304. Using the right-half of the Conversion Key, DES-decrypt the first Electronic-Commerce PIN generation result, thereby producing a second Electronic-Commerce PIN generation result.

STEP 305. Using (again) the left-half of the Conversion Key, DES-encrypt the second Electronic-Commerce PIN generation result, thereby producing a third Electronic-Commerce PIN generation result.

STEP 306. Obtain the cleartext ATM PIN and count the number of digits in this PIN.

STEP 307. Starting with the left-most hex digit of the third Electronic-Commerce PIN generation result, select those hex digits in the range 0-9 until as many digits have been selected as there are digits in the ATM PIN, or until all 16 hex digits of the third Electronic-Commerce PIN generation result have been examined (Step 307a). If all 16 hex digits of the third Electronic-Commerce PIN generation result have been examined and there are fewer digits in the range 0-9 than required (Step 307b), find the remaining needed digits by re-examining the third Electronic-Commerce PIN generation result, this time selecting only hex digits in the range A through F, and converting each such digit into a decimal digit by subtracting hex "A" from (Step 307c). Step 307 produces a fourth Electronic-Commerce PIN generation result, which is a cryptographically-computed decimal number having as many digits as the ATM PIN.

STEP 308. If the value of the fourth Electronic-Commerce PIN generation result exceeds the value of the ATM PIN (Step 308a), concatenate a binary-coded-decimal digit of value "1" to the left of the ATM PIN (Step 308b). Otherwise lave the ATM PIN unchanged (Step 308c). Step 308 produces a fifth Electronic-Commerce PIN generation result consisting of the ATM PIN or the ATM PIN with a "1" digit concatenated to the left.

STEP 309. Subtract the fourth Electronic-Commerce PIN generation result from the fifth Electronic-Commerce PIN generation result. This produces a sixth Electronic-Commerce PIN generation result, which has as many digits as does the ATM PIN.

STEP 310. Use the sixth Electronic-Commerce PIN generation result as the Electronic-Commerce PIN.

The Electronic-Commerce PIN can then be conveyed to the cardholder by secure means, such as a PIN mailer.

Generation by the Master Debit Switch

When the Electronic-Commerce PIN is generated by the MDS rather than by the issuer, the MDS should have access to both the account number and the cleartext PIN. Presumably a copy of the issuer's entire PIN data base can be transferred to the MDS, though it is preferably transferred and stored encrypted under a securely-managed double-length key.

When the MDS is to generate an Electronic-Commerce PIN from an ATM PIN for a given account, it examines the account number and determines the account number's BIN from its BIN tables. Using the BIN, and the Conversion Key Derivation Key which the MDS derives within its host security module, the MDS generates a Conversion Key appropriate to this BIN, using the Conversion Key generation procedure described above and shown in FIG. 1. Using this Conversion Key, the account number, and the cleartext ATM PIN, the MDS then performs steps 302 through 310 above, except that in Step 301 "Select Conversion Key" is replaced with "Derive Conversion Key". All of the cryptographic operations are preferably performed within the MDS's host security module, and neither the cleartext ATM PIN nor the Electronic-Commerce PIN (except for conveyance to the cardholder) should ever leave this module.

Again, the Electronic-Commerce PIN is preferably conveyed to the cardholder in a PIN mailer or by equivalently secure means. When printed within such a document, the printer is preferably connected directly to the MDS's host security module.

PIN Conversion

For those transactions that pass through the MDS, conversion from the Electronic-Commerce PIN to the ATM PIN can be performed at this switch. In some areas of the world, however, a distributed network, rather than a "star" network, is commonly used, and each "member" (i.e., institution, such as a bank, which offers card products associated with the aforementioned network) may have its own processor (hereinafter, "Member Interface Processor") in its Electronic Data Processing ("EDP") facility. In such areas a transaction does not necessarily pass through the MDS, but instead may be directly transmitted from the Member Interface Processor of the "acquirer" (i.e., the bank or financial institution of the merchant) to the Member Interface Processor of the issuer. In this situation the PIN conversion generally occurs within the issuer's Member Interface Processor.

PIN Conversion in the Master Debit Switch

Figure 4:
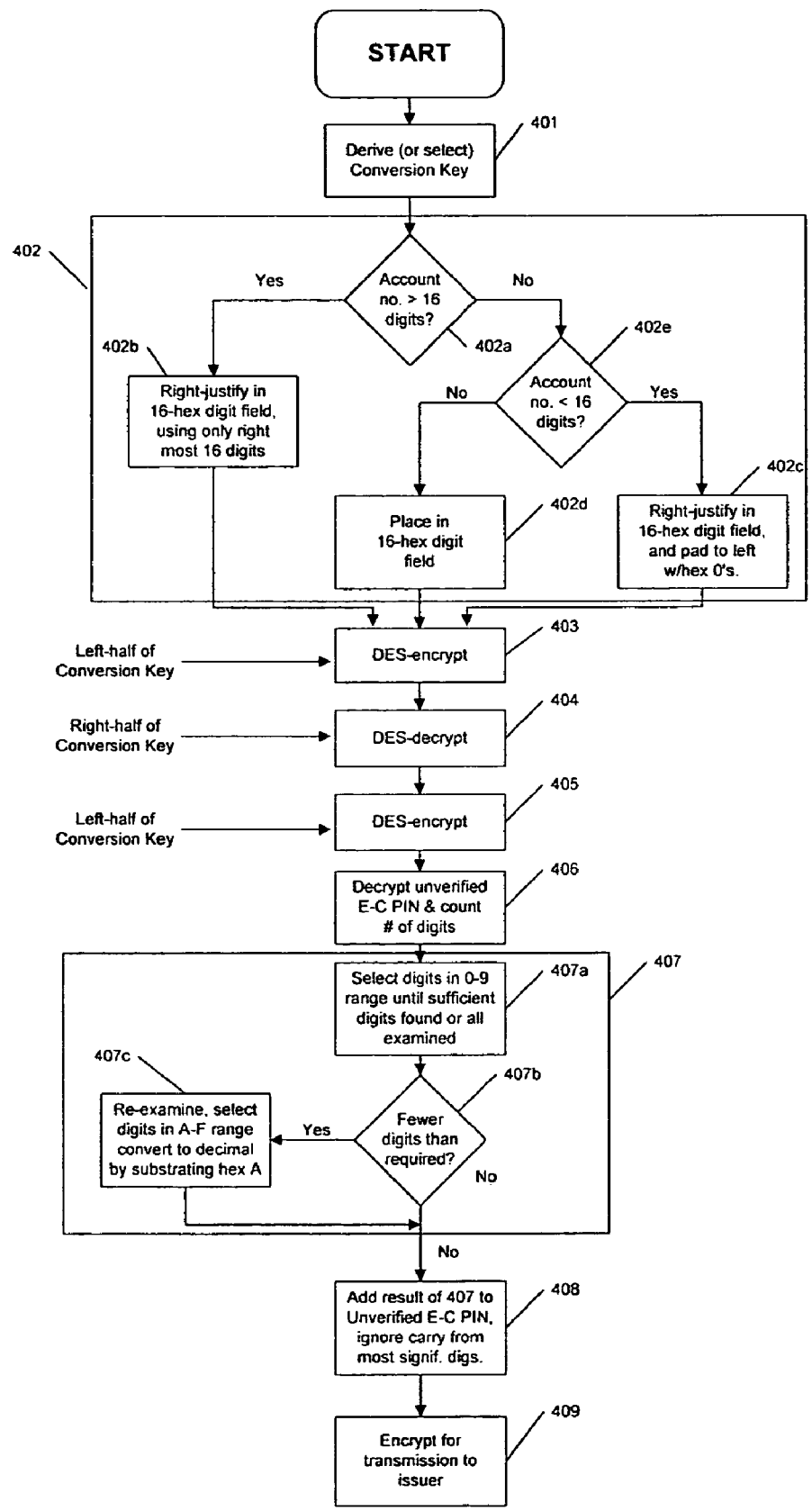
FIG. 4 is a flow chart of an exemplary procedure for converting an Electronic-Commerce PIN into an ATM PIN in accordance with the invention.
Figure 5:
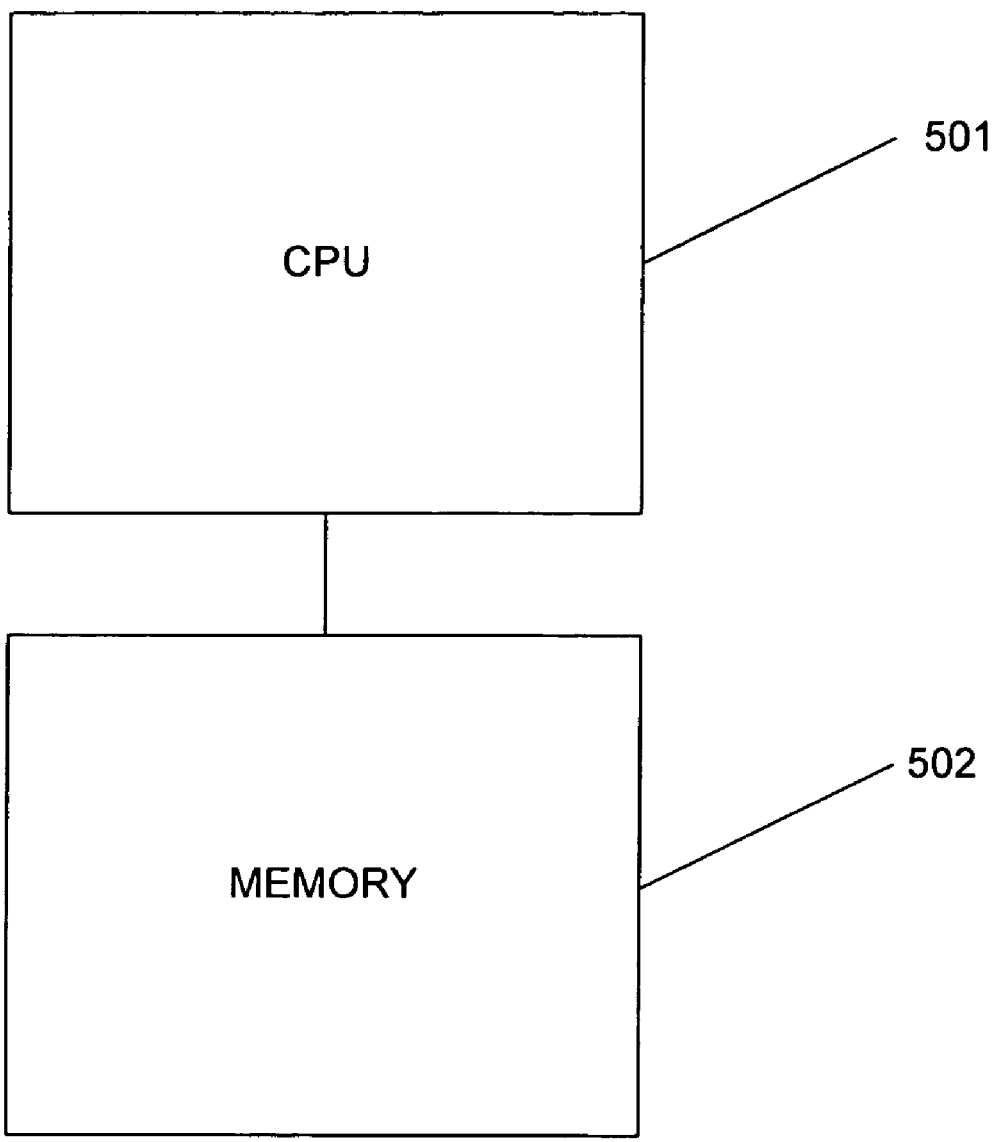
FIG. 5 is a diagram of an exemplary system accordance with the invention.

When the MDS receives an electronic-commerce transaction it first determines the associated BIN from the transaction's account number using its BIN table. It then provides the BIN and the account number to its host security module. In addition, an unverified Electronic-Commerce PIN would normally be received in encrypted form in an electronic-commerce transaction, and the MDS can provide the encrypted, unverified Electronic-Commerce PIN to the host security module. The module can then perform the following exemplary PIN Conversion procedure, illustrated in FIG. 4:

STEP 401. Use the BIN and the module's internally stored Conversion Key Derivation Key to derive (cryptographically compute) the Conversion Key appropriate to the BIN using a process such as the above-described, exemplary Conversion Key generation procedure (see FIG. 1).

STEP 402. Right-justify the card's account number as binary-coded-decimal in a 16-hex digit field. If the account number exceeds 16 digits (Step 402a), use only the right-most 16 digits (Step 402b). If the account number has fewer than 16 digits (Step 402e), pad to the left with hex "0" (Step 402c). If the account number has exactly 16 digits, simply use all of the digits; there is no need to pad the number (Step 402d). Step 402 produces initial data for use in the PIN conversion procedure.

STEP 403. Using the left-half of the derived Conversion Key, DES-encrypt the initial data, thereby producing a first PIN conversion result.

STEP 404. Using the right-half of the Conversion Key, DES-decrypt the first PIN conversion result, thereby producing a second PIN conversion result.

STEP 405. Using (again) the left-half of the Conversion Key, DES-encrypt the second PIN conversion result, thereby producing a third PIN conversion result.

STEP 406. Decrypt the unverified Electronic-Commerce PIN and count the number of digits in this PIN.

STEP 407. Starting with the left-most hex digit of the third PIN conversion result, select those hex digits in the range 0-9 until as many digits have been selected as there are digits in the unverified Electronic-Commerce PIN, or until all 16 hex digits of the third PIN conversion result have been examined (Step 407a). If all 16 hex digits of the third PIN conversion result have been examined and there are fewer digits in the range 0-9 than required (Step 407b), find the remaining needed digits by re-examining the third PIN conversion result, this time selecting only hex digits in the range A through F, and converting each such digit into a decimal digit by subtracting hex "A" from it (Step 407c). Step 407 produces a fourth PIN conversion result, which is a decimal number having as many digits as the unverified Electronic-Commerce PIN.

STEP 408. Add the fourth PIN conversion result to the unverified Electronic-Commerce PIN to produce a sum, selecting as many of the right-most digits of the sum as there are digits in the unverified Electronic-Commerce PIN (i.e. ignoring any carry from the sum of the most-significant digits). Step 408 produces a fifth PIN conversion result, which corresponds to the correct ATM PIN if the unverified Electronic-Commerce PIN is correct.

STEP 409. Appropriately encrypt the fifth PIN conversion result for transmission to the issuer.

Pin Conversion in the Member-Interface Processor

When the transaction is delivered to a Member Interface Processor at the issuer's facility, this processor makes the conversion from Electronic-Commerce PIN to ATM PIN. The Member Interface Processor contains a form of security module, and this module is able to decrypt and re-encrypt PINs. This module can also perform the conversion from Electronic-Commerce PIN to ATM PIN.

In this case, the Conversion Key is not derived by the Member Interface Processor, but rather the Conversion Keys appropriate to the member's BINs can be made available within the security-module portion of this processor. In this example, the keys originate with the MDS, and those appropriate to a given Member Interface Processor can be transferred from the MDS to this processor by secure means prior to the first use of the Member Interface Processor for PIN conversion. Thus, the Conversion Key appropriate to the current transaction can be selected by the Member Interface Processor from these available keys, based on the BIN of the current transaction. In this way the compromise of one Member Interface Processor would not disclose the Conversion Keys of any other members.

After the appropriate Conversion Key has been selected, steps 402 through 409 of the above-described PIN conversion process are performed (except that in Step 403 "derived Conversion Key" is replaced with "selected Conversion Key"). The Member Interface Processor then appropriately encrypts the sixth PIN conversion result and forwards it to the member's EDP system for verification (which entails comparing the sixth PIN conversion result to the correct ATM PIN), just as if the transaction had originated at an ATM or point-of-sale (POS) terminal.

It will be appreciated by those skilled in the art that the methods of FIGS. 1-4 can be implemented on various standard computer platforms operating under the control of suitable software comparable to that defined by FIGS. 1-4. In some cases, dedicated computer hardware, such as a peripheral card which resides on the bus of a standard personal computer, may enhance the operational efficiency of the above methods, but different computer processors, memory configurations, data structures and the like can be used to practice the present invention, and the invention is not limited to a specific platform.

Although the present invention has been described in connection with specific exemplary embodiments, it should be understood that various changes, substitutions and alterations can be made to the disclosed embodiments without departing from the spirit and scope of the invention as set forth in the appended claims.

We claim:

1. A method for generating identification data comprising:
   selecting by a first computer an ATM PIN from a plurality of ATM PINs;
   selecting by the first computer an account number corresponding to the selected ATM PIN;
   selecting by the first computer a BIN corresponding to the selected account number;
   selecting by the first computer a key corresponding to the BIN;
   generating by the first computer an electronic commerce PIN using the selected key, the ATM PIN and the account number;
   receiving the electronic commerce PIN and transaction information corresponding to the electronic commerce PIN from a second computer;
   selecting a conversion key by the first computer based on said transaction information;
   deriving the ATM PIN by the first computer using the conversion key, the electronic commerce PIN and the account number;
   verifying the ATM PIN by the first computer;
   encrypting the derived ATM PIN by the first computer and transmitting the encrypted ATM PIN and the transaction information to a third computer specific to the selected BIN.

2. The method of claim 1 wherein said conversion key is associated with:
   conversion key derivation data and a
   conversion key derivation key.

3. The method of claim 2, wherein the conversion key derivation key is used to perform at least one cryptographic operation upon the conversion key derivation data.

4. The method of claim 3, wherein the conversion key derivation data includes an identification number associated with multiple accounts;
   and wherein at least one cryptographic operation using a secret key is performed to cryptographically process said conversion key derivation data to produce the conversion key.

5. The method of claim 1, wherein generating an electronic commerce pin comprises:
   accessing cryptographically-computed data; and
   performing an operation upon the ATM PIN and the cryptographically-computed data.

6. The method of claim 5, wherein said cryptographically-computed data is generated using a secret key to perform a cryptographic operation on initial data.

7. The method of claim 6, wherein said cryptographic operation comprises at least one of a DES-encryption and a DES-decryption.

8. The method of claim 7, wherein a portion of said initial data is obtained from at least a portion of an account number.

9. The method of claim 8, wherein performing an operation upon the ATM PIN and the cryptographically-computed data comprises performing either a subtraction operation or an addition operation.

10. A system for generating identification data comprising:
a first computer selecting an ATM PIN from a plurality of ATM PINs,
a first computer selecting an account number corresponding to the selected ATM PIN,
a first computer selecting a BIN corresponding to the selected account number;
a first computer selecting a key corresponding to the BIN;
a first computer generating an electronic commerce PIN using the selected key, the ATM PIN and the account number;
a first computer receiving the electronic commerce PIN and transaction information corresponding to the electronic commerce PIN from a second computer;
a first computer selecting a conversion key based on said transaction information;
a first computer deriving the ATM PIN using the conversion key, the electronic commerce PIN and the account number;
a first computer verifying the ATM PIN;
a first computer encrypting the derived ATM PIN and transmitting the encrypted ATM PIN and the transaction information to a third computer specific to the selected BIN.

11. The system of claim 10 wherein said conversion key is associated with:
conversion key derivation data and a
conversion key derivation key.

12. The system of claim 11, wherein the conversion key derivation key is used to perform at least one cryptographic operation upon the conversion key derivation data.

13. The system of claim 12, wherein the conversion key derivation data includes an identification number associated with multiple accounts;
and wherein at least one cryptographic operation using a secret key is performed to cryptographically process said conversion key derivation data to produce the conversion key.

14. The system of claim 10, wherein generating an electronic commerce PIN comprises accessing cryptographically-computed data and said cryptographically-computed data is generated with a secret key used to perform a cryptographic operation on initial data.

15. The system of claim 14, wherein said cryptographic operation comprises at least one of a DES-encryption and a DES-decryption.

16. The system of claim 15, wherein a portion of said initial data is obtained from at least a portion of an account number.

17. The system of claim 16, wherein performing an operation upon the ATM PIN and the cryptographically-computed data comprises performing either a subtraction operation or an addition operation.

18. A system for generating identification data comprising:
a memory on a first computer;
a processor on said first computer in communication with the memory;
a computer readable medium on said first computer in communication with the processor and storing instructions which, when executed, cause the processor to perform the steps of:
selecting an ATM PIN from a plurality of ATM PINs,
selecting an account number corresponding to the selected ATM PIN,
selecting a BIN corresponding to the selected account number;
selecting a key corresponding to the BIN;
generating an electronic commerce PIN using the selected key, the ATM PIN and the acct number;
receiving the electronic commerce PIN and transaction information corresponding to the electronic commerce PIN from a second computer;
selecting a conversion key based on said transaction information;
deriving the ATM PIN using the conversion key, the electronic commerce PIN and the account number;
verifying the ATM PIN by the first computer;
encrypting the derived ATM PIN and transmits the encrypted ATM PIN and the transaction information to a third computer specific to the selected BIN.

19. The system of claim 18 wherein said conversion key is associated with:
conversion key derivation data and a
conversion key derivation key.

20. The system of claim 19, wherein the conversion key derivation key is used to perform at least one cryptographic operation upon the conversion key derivation data.

21. The system of claim 20, wherein the conversion key derivation data includes an identification number associated with multiple accounts;
and wherein at least one cryptographic operation using a secret key is performed to cryptographically process said conversion key derivation data to produce the conversion key.

22. The system of claim 18, wherein generating an electronic commerce PIN comprises accessing cryptographically-computed data and said cryptographically-computed data is generated with a secret key used to perform a cryptographic operation on initial data.

23. The system of claim 22, wherein said cryptographic operation comprises at least one of a DES-encryption and a DES-decryption.

24. The system of claim 23, wherein a portion of said initial data is obtained from at least a portion of an account number.

25. The system of claim 24, wherein performing an operation upon the ATM PIN and the cryptographically-computed data comprises performing either a subtraction operation or an addition operation.

* * * * *